US010830708B2

(12) United States Patent
Maruta

(10) Patent No.: US 10,830,708 B2
(45) Date of Patent: Nov. 10, 2020

(54) INSPECTION SYSTEM, INSPECTION METHOD, AND STORAGE MEDIUM

(71) Applicants: KABUSHIKI KAISHA TOSHIBA, Minato-ku (JP); TOSHIBA ELECTRONIC DEVICES & STORAGE CORPORATION, Minato-ku (JP)

(72) Inventor: Miyuki Maruta, Kanazawa (JP)

(73) Assignees: KABUSHIKI KAISHA TOSHIBA, Minato-ku (JP); TOSHIBA ELECTRONIC DEVICES & STORAGE CORPORATION, Minato-ku (JP)

( * ) Notice: Subject to any disclaimer, the term of this patent is extended or adjusted under 35 U.S.C. 154(b) by 226 days.

(21) Appl. No.: 16/103,087

(22) Filed: Aug. 14, 2018

(65) Prior Publication Data
US 2019/0277775 A1 Sep. 12, 2019

(30) Foreign Application Priority Data
Mar. 7, 2018 (JP) ................................. 2018-040397

(51) Int. Cl.
G01N 21/95 (2006.01)
G01N 21/55 (2014.01)
G01N 21/47 (2006.01)

(52) U.S. Cl.
CPC ......... G01N 21/9501 (2013.01); G01N 21/47 (2013.01); G01N 21/55 (2013.01)

(58) Field of Classification Search
CPC .................................. G01N 21/9501

USPC ...................................... 356/237.5
See application file for complete search history.

(56) References Cited

U.S. PATENT DOCUMENTS 6,104,481 A 8/2000 Sekine et al.
2004/0263830 A1* 12/2004 Shiba ................. G01R 31/308
356/237.1
2005/0018183 A1* 1/2005 Shortt ................ G01B 11/0633
356/239.1

(Continued)

FOREIGN PATENT DOCUMENTS

JP 04-042945 2/1992
JP 08-201305 8/1996
JP 11-160245 6/1999

Primary Examiner — Tarifur R Chowdhury
Assistant Examiner — Omar H Nixon
(74) Attorney, Agent, or Firm — Oblon, McClelland, Maier & Neustadt, L.L.P.

(57) ABSTRACT

According to one embodiment, an inspection system includes a holder, an irradiation part, a detector, and a controller. The irradiation part irradiates a first light toward a surface of a substrate held on the holder. The detector detects an intensity of a second light generated by reflection or scattering of the first light. The controller sets a first intensity range corresponding to an intensity of light reflected or scattered by a region not including slip of the surface. The controller sets a second intensity range corresponding to an intensity of light reflected or scattered by the slip. An upper limit and a lower limit of the second intensity range each are larger than an upper limit of the first intensity range. The controller extracts, as a length of the slip, a length of a region where the intensity of the second light is included in the second intensity range.

12 Claims, 5 Drawing Sheets

(56) References Cited

U.S. PATENT DOCUMENTS

| | | | |
|---|---|---|---|
| 2006/0124874 A1* | 6/2006 | Uto | G01N 21/9501 |
| | | | 250/559.45 |
| 2006/0139629 A1* | 6/2006 | Ohshima | G01N 21/94 |
| | | | 356/237.2 |
| 2006/0181700 A1* | 8/2006 | Andrews | G01N 21/474 |
| | | | 356/237.2 |
| 2013/0016346 A1* | 1/2013 | Romanovsky | G01N 21/956 |
| | | | 356/237.5 |
| 2014/0152976 A1* | 6/2014 | VanHoomissen | |
| | | | G01N 21/9505 |
| | | | 356/51 |
| 2015/0371910 A1* | 12/2015 | Goodwin | G01N 21/95 |
| | | | 438/7 |
| 2016/0202177 A1* | 7/2016 | Li | G01N 21/21 |
| | | | 356/364 |

* cited by examiner

INSPECTION SYSTEM, INSPECTION METHOD, AND STORAGE MEDIUM

CROSS-REFERENCE TO RELATED APPLICATIONS

This application is based upon and claims the benefit of priority from Japanese Patent Application No. 2018-040397, filed on Mar. 7, 2018; the entire contents of which are incorporated herein by reference.

FIELD

Embodiments described herein relate generally to an inspection system, an inspection method, and a storage medium.

BACKGROUND

When performing heat treatment of a semiconductor substrate, level differences may occur in the surface of the semiconductor substrate due to crystal defects such as slip, etc. The yield of a semiconductor device made using the semiconductor substrate decreases as the length of the slip increases. Accordingly, it is desirable for the slip to be short.

There is an inspection system that inspects the surface of the semiconductor substrate and extracts the length of the slip. To discover the heat treatment conditions by which the slip can be shortened, it is desirable to be able to extract the length of the slip more accurately.

DETAILED DESCRIPTION

Figure 1:
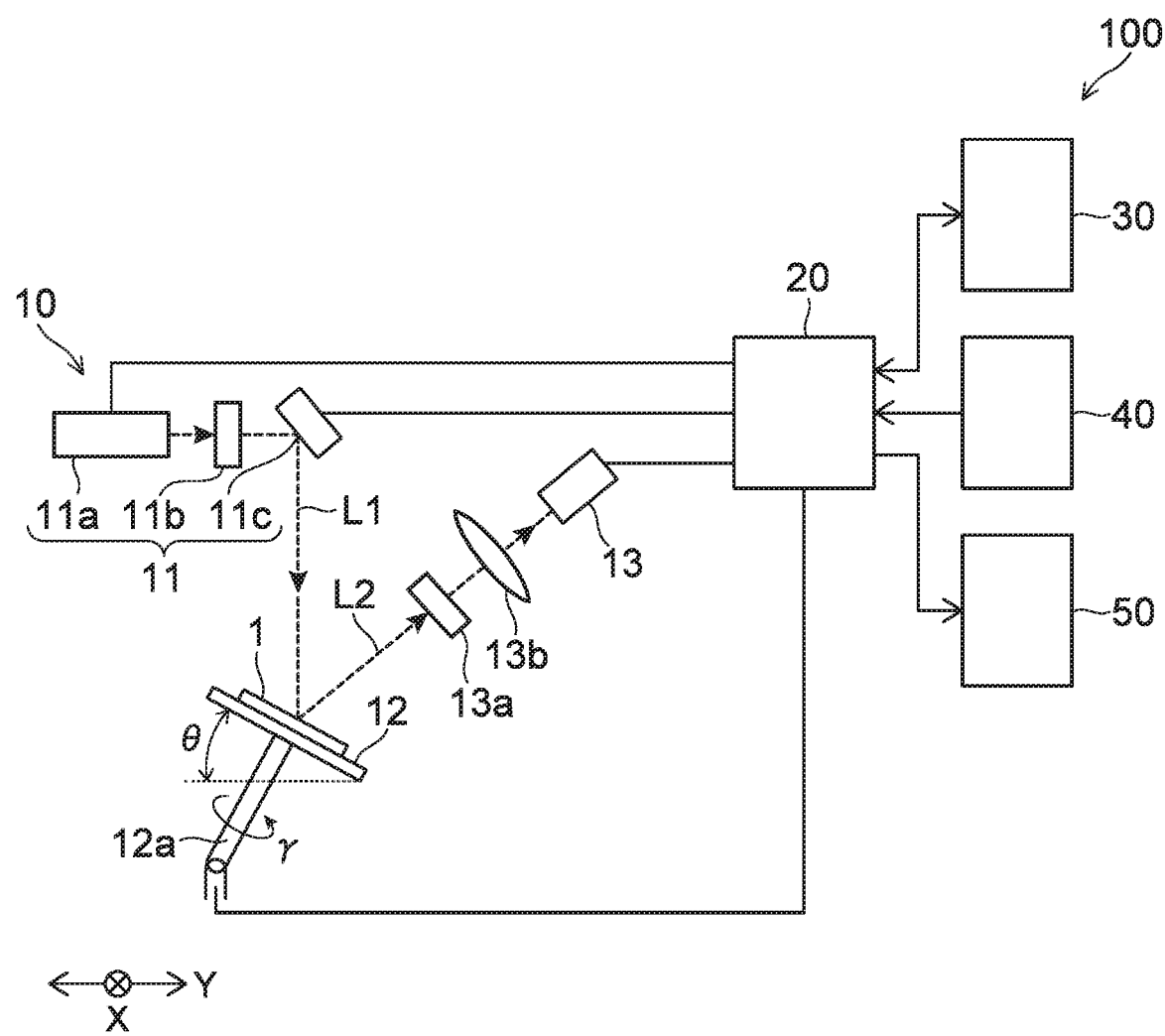
FIG. 1 is a schematic view illustrating an inspection system according to an embodiment.

According to one embodiment, an inspection system includes a holder, an irradiation part, a detector, and a controller. The holder is configured to hold a semiconductor substrate. The irradiation part is configured to irradiate a first light toward a surface of the semiconductor substrate and scanning the first light over the surface. The detector is configured to detect an intensity of a second light generated by reflection or scattering of the first light at each point of the surface. A detection result from the detector is input to the controller. The controller sets a first intensity range corresponding to an intensity of light reflected or scattered by a region not including slip of the surface. The controller sets, based on the first intensity range, a second intensity range corresponding to an intensity of light reflected or scattered by the slip of the surface. An upper limit and a lower limit of the second intensity range each are larger than an upper limit of the first intensity range. The controller extracts, as a length of the slip, a length of a region where the intensity of the second light is included in the second intensity range.

Various embodiments will be described hereinafter with reference to the accompanying drawings.

In the specification and drawings, components similar to those described or illustrated in a drawing thereinabove are marked with like reference numerals, and a detailed description is omitted as appropriate.

FIG. 1 is a schematic view illustrating an inspection system according to an embodiment.

As illustrated in FIG. 1, the inspection system 100 according to the embodiment includes an inspection apparatus 10, a controller 20, memory 30, an inputter 40, and an outputter 50.

The inspection apparatus 10 irradiates light on the surface of a semiconductor substrate 1. The inspection apparatus 10 inspects the slip of the semiconductor substrate 1 surface by detecting the reflected light or the scattered light. The memory 30 stores information used in the inspection, information based on the inspection, a program controlling the operations of the inspection apparatus 10, etc. The memory 30 is used also as a memory region where the program is implemented. The memory 30 includes, for example, at least one of a HDD (Hard Disk Drive), a SSD (Solid State Drive), ROM (Read Only Memory), or RAM (Random Access Memory).

The controller 20 executes a program stored in the memory 30 and controls the operations of the inspection apparatus 10. The controller 20 performs various processing based on the information obtained by the inspection apparatus 10. The controller 20 stores the information obtained from the processing or from the result of the processing in the memory 30 as appropriate. The controller 20 includes, for example, a CPU (Central Processing Unit).

The inputter 40 is used when inputting information to the controller 20. The inputter 40 includes, for example, at least one of a keyboard, a mouse, a touch panel, or a microphone (voice input). The outputter 50 outputs, to the user of the inspection system 100, the information processed by the controller 20. The outputter 50 includes, for example, at least one of a display, a printer, or a speaker.

The inspection apparatus 10 includes an irradiation part 11, a holder 12, and a detector 13.

The irradiation part 11 irradiates light toward the surface of the semiconductor substrate 1 and scans the light over the surface. The irradiation part 11 includes, for example, an oscillator 11a, a filter 11b, and a mirror 11c. The oscillator 11a radiates laser light L1 (a first light). For example, the laser light L1 passes through the filter 11b and is circularly polarized or linearly polarized. The spot diameter of the laser light L1 is wider than the width of the slip. The mirror 11c reflects the laser light L1 toward the semiconductor substrate 1. For example, the tilt of the mirror 11c changes so that the laser light L1 is scanned in an X-direction over the surface of the semiconductor substrate 1.

For example, the holder 12 holds the semiconductor substrate 1 by a vacuum. The holder 12 is linked to an arm 12a. A tilt θ, a rotation angle γ, and the position in a Y-direction of the holder 12 are adjusted by driving the arm 12a. The scanning in the X-direction over the semiconductor substrate 1 surface by the irradiation part 11 and the movement in the Y-direction of the semiconductor substrate 1 by the arm 12a are repeated alternately. Thereby, the entire region of the semiconductor substrate 1 surface is scanned.

The detector 13 detects light L2 (a second light). The light L2 is generated by reflection or scattering of the light L1 at each point of the semiconductor substrate 1 surface. The light L2 may include only reflected light of the light L1, only scattered light of the light L1, or both reflected light of the light L1 and scattered light of the light L1. For example, the light L2 passes through a filter 13a and a lens 13b and is incident on the detector 13.

The incident angle of the laser light L1 on the semiconductor substrate 1 surface is adjusted so that more of the light L2 is incident on the detector 13. The detector 13 is disposed so that the light reflected or scattered by the slip of the semiconductor substrate 1 is incident more than the light reflected or scattered by a region not including slip. The detector 13 converts the light L2 into an electrical signal and inputs the signal to the controller 20. The strength of the converted signal corresponds to the intensity of the light L2.

The operations of the irradiation part 11 and the holder 12 are controlled by the controller 20. The detection result from the detector 13 is input to the controller 20. The controller 20 associates the intensity of the light reflected or scattered by the points where the laser light L1 is irradiated with the coordinates in the X-direction and the coordinates in the Y-direction of the points and stores the results in the memory 30. When the entire region of the semiconductor substrate 1 has been scanned using the laser light L1, the controller 20 extracts the length of the slip of the surface of the semiconductor substrate 1 based on the detection result.

The directions in which the slip extends are aligned with the crystal orientations. For example, the tilt θ and the rotation angle γ of the holder 12 are set so that the laser light L1 is scanned along one of the crystal orientations.

In the inspection system 100, for example, the inspection apparatus 10 is connected to the controller 20, the memory 30, the inputter 40, and the outputter 50 by a wired method. Or, these components may be connected to each other by a wireless communication. Or, these components may be connected to each other via a network. The specific configuration of the inspection apparatus 10 is modifiable as appropriate as long as the laser light can be irradiated on the surface of the semiconductor substrate 1, the scattered light or the reflected light can be detected, and the slip of the surface can be inspected.

A specific operation of the inspection system 100 will now be described with reference to FIG. 2.

Figure 2:
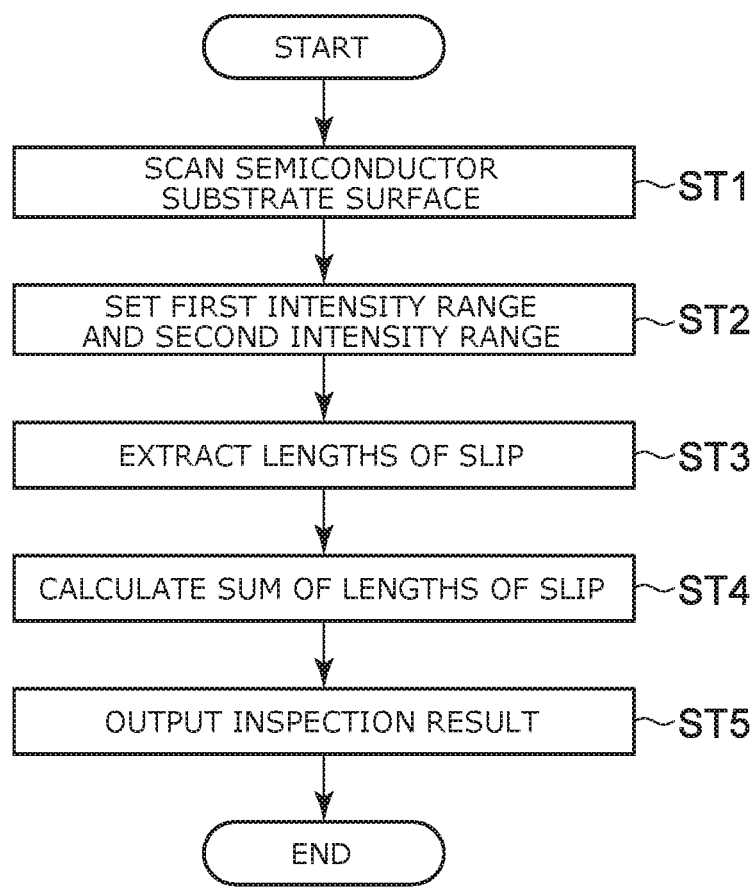
FIG. 2 is a flowchart illustrating the operation of the inspection system according to the embodiment.

FIG. 2 is a flowchart illustrating the operation of the inspection system according to the embodiment.

First, the inspection apparatus 10 scans the entire region of the surface of the semiconductor substrate 1 by irradiating the laser light L1 (step ST1). Thereby, the intensity of the light L2 reflected or scattered at each point of the semiconductor substrate 1 surface is detected. For example, the light L2 includes the reflected light and a portion of the scattered light of the semiconductor substrate 1 surface. The light L2 is detected by the detector 13. For example, the controller 20 generates an image showing the surface of the semiconductor substrate 1 based on the intensity of the detected light L2. For example, the brightness of each point of the image is represented using 4096 gradations and corresponds to the intensity of the light L2.

The controller 20 sets a first intensity range and a second intensity range from the detection result of step ST1 (step ST2). The first intensity range corresponds to the intensity of the light reflected or scattered by a region not including slip. Typically, much of the surface of the semiconductor substrate 1 is in a normal state in which slip, scratches, dirt, etc., do not exist. Accordingly, the controller 20 sets a range including a relatively low light intensity as the first intensity range. The second intensity range corresponds to the intensity of the light reflected or scattered by the slip. The lower limit and the upper limit of the second intensity range are larger than the upper limit of the first intensity range.

For example, the lower limit of the second intensity range is set to be not less than 1.05 times and not more than 1.1 times the upper limit of the first intensity range. The upper limit of the second intensity range is set to be greater than 1.1 times but not more than 1.5 times the upper limit of the first intensity range. For example, the difference between the upper limit and the lower limit of the second intensity range is the same as the difference between the upper limit and the lower limit of the first intensity range. Or, as an example, in the case where the brightness in the image is represented using 4096 gradations according to the signal strength of the light L2, the lower limit of the second intensity range is set to a value of 100 gradations added to the upper limit of the first intensity range. The upper limit of the second intensity range is set to a value of 1000 gradations added to the upper limit of the first intensity range.

The controller 20 extracts the length of the slip (step ST3). Specifically, the controller 20 compares the set second intensity range and the intensity of the light L2 detected at each point of the semiconductor substrate 1 surface. The controller 20 extracts the region where the intensity is included in the second intensity range and determines the length of the region. The controller 20 calculates the sum of the length of the extracted slip (step ST4). The outputter 50 outputs the result of the inspection (step ST5). For example, the outputter 50 outputs the image showing the surface of the semiconductor substrate 1 generated based on the detection result and the sum of the length of the slip.

Figure 3:
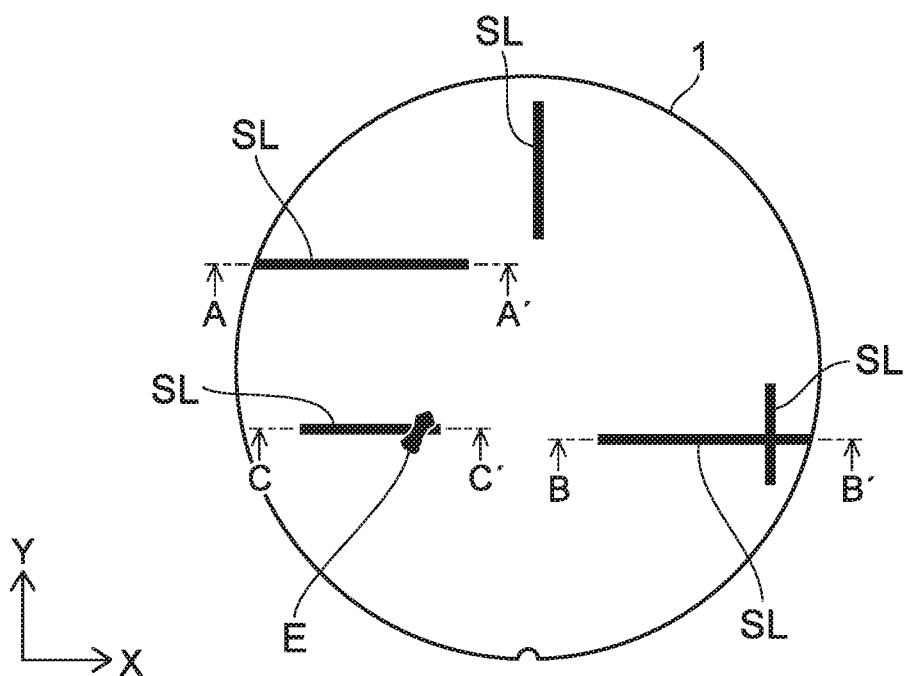
FIG. 3 is a schematic view illustrating the surface of the semiconductor substrate.

FIG. 3 is a schematic view illustrating the surface of the semiconductor substrate.

As illustrated in FIG. 3, there are cases where slip SL occurs in the surface of the semiconductor substrate 1. For example, the slip SL occurs along the crystal orientations when heat treatment of the semiconductor substrate is performed. For example, the slip SL occurs along a first direction and along a second direction intersecting the first direction. The angle between the first direction and the second direction is greater than 0 degrees but less than 180 degrees. In the example illustrated in FIG. 3, the slip SL occurs along the X-direction and the Y-direction which are orthogonal to each other. Other than the slip SL, there are cases where foreign matter E such as a scratch, dirt, etc., exist at the surface of the semiconductor substrate 1.

Figure 4:
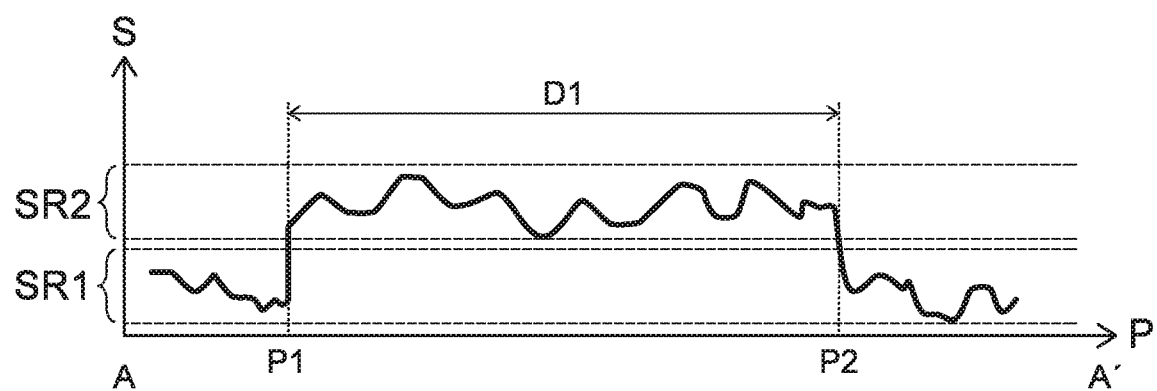
FIG. 4 is a graph illustrating the detection result of the reflected light and the scattered light of the semiconductor substrate surface.

FIG. 4 is a graph illustrating the detection result of the reflected light and the scattered light of the semiconductor substrate surface.

FIG. 4 illustrates the detection result along line A-A' of FIG. 3. In FIG. 4, the horizontal axis is a position P in the X-direction along line A-A'. The vertical axis is an intensity S of the light L2 detected by the detector 13 when the laser light L1 is irradiated on each point along line A-A'.

In FIG. 4, SR1 illustrates the first intensity range. SR2 illustrates the second intensity range. The controller 20 extracts, as the length of the slip SL, a distance D1 from a point P1 to a point P2 where the intensities are included in the second intensity range SR2 (the length of the region from the point P1 to the point P2). Similarly, the controller 20 extracts the lengths of the other slip and calculates the sum of the lengths of the multiple slip.

Effects of the embodiment will now be described with reference to FIGS. 5A and 5C.

Figure 5A:
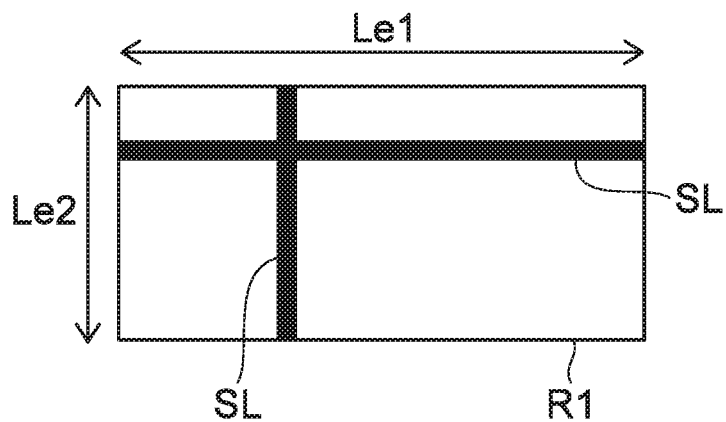
FIGS. 5A to 5C are schematic views illustrating processing by an inspection system according to a reference example and the processing by the inspection system according to the embodiment.
Figure 5B:
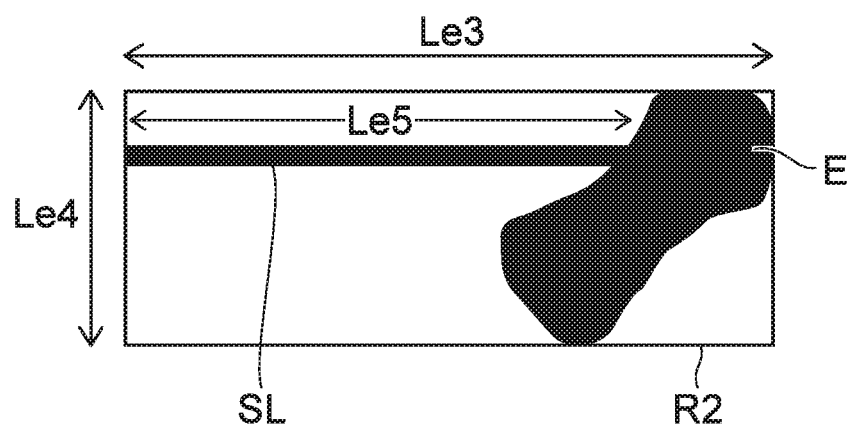
Figure 5C:
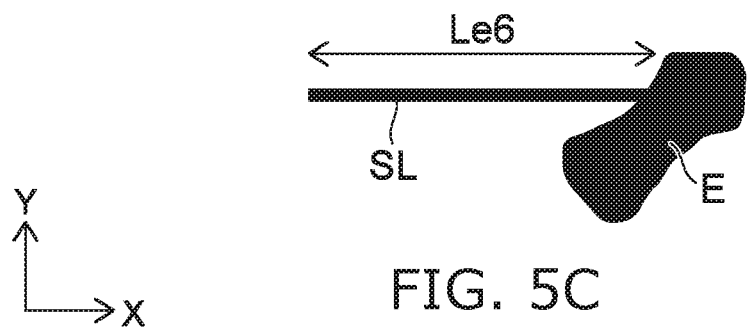

FIGS. 5A to 5C are schematic views illustrating processing by an inspection system according to a reference example and the processing by the inspection system according to the embodiment.

In the inspection system according to the reference example, clustering of the regions where the slip SL exists is performed to extract the length of the slip SL. In the clustering, for example, a rectangular region R1 that includes the slip SL is set as illustrated in FIG. 5A. Then, the sum of a length Le1 in the X-direction and a length Le1 in the Y-direction of the rectangular region R1 are extracted as the length of the slip SL. The processing can be faster by clustering.

On the other hand, as illustrated in FIG. 5B, there are cases where the foreign matter E exists on the slip SL, or foreign matter that is continuous with the slip SL exists. In such a case, the sum of a length Le3 in the X-direction and a length Le4 in the Y-direction of a clustering region R2 is extracted as the length of the slip SL. In other words, a value that is much different from an actual length Le5 of the slip SL is extracted as the length of the slip SL.

To verify the relationship between the conditions of the heat treatment and the slip occurring due to the heat treatment in detail, it is desirable to be able to extract the length of the slip more accurately. In the processing according to the inspection system according to the reference example, in the case where the foreign matter E exists at the slip SL vicinity as illustrated in FIG. 5B, it is difficult to accurately extract the length of the slip SL.

In the inspection system 100 according to the embodiment, the controller 20 sets the first intensity range based on the detection result. Based on the first intensity range, the controller 20 sets the second intensity range corresponding to the intensity of the light reflected or scattered by the slip SL. The controller 20 refers to the detection result by the detection unit 13. Typically, the intensity of the light reflected or scattered by the foreign matter E is larger than the intensity of the light reflected or scattered by the slip SL. Accordingly, the effects of the foreign matter E can be reduced by extracting, as the length of the slip SL, the length of the region where the intensity of the light L2 is included in the second intensity range. As a result, as illustrated in FIG. 5C, a length Le6 of only the slip SL can be extracted. In other words, according to the inspection system 100 according to the embodiment, the length of the slip SL can be extracted more accurately even in the case where the foreign matter E exists at the surface of the semiconductor substrate 1.

First Modification

Figure 6:
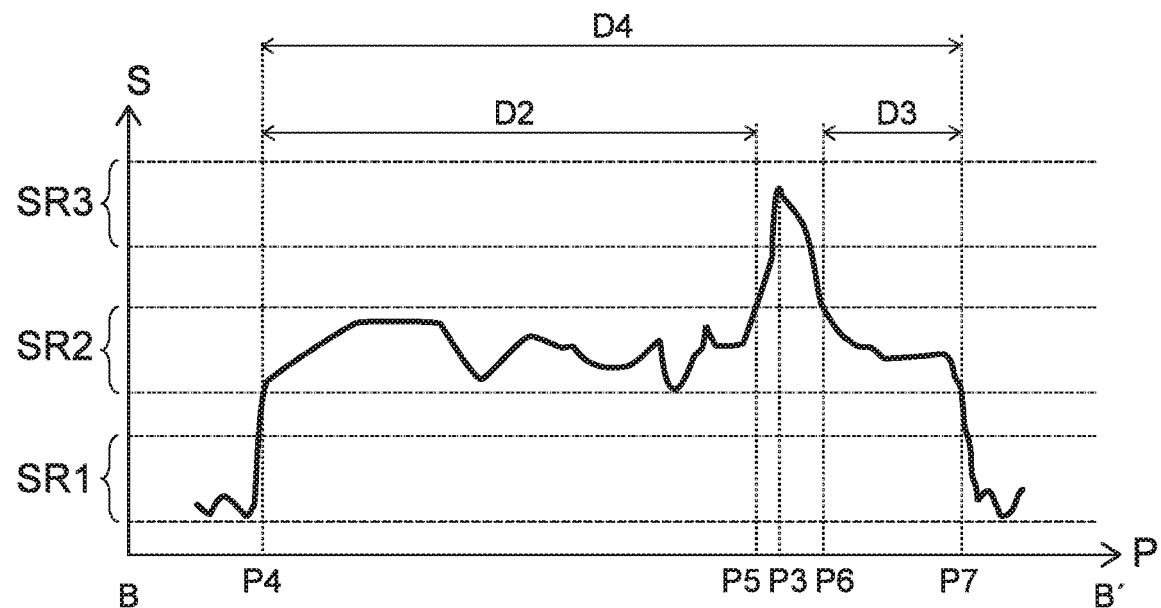
FIG. 6 is a graph illustrating a detection result of the reflected light and the scattered light of the semiconductor substrate surface.

FIG. 6 is a graph illustrating a detection result of the reflected light and the scattered light of the semiconductor substrate surface.

FIG. 6 illustrates the detection result along line B-B' of FIG. 3.

As illustrated in FIG. 3, an intersection of the slip SL may occur. The intensity of the light reflected or scattered by the intersection of the slip SL is larger than the intensity of the light reflected or scattered by the slip SL. For example, in the example illustrated in FIG. 6, an intersection of the slip SL exists at a point P3.

In the case where the region that is extracted is only the region where the intensity of the reflected or scattered light L2 is included in the second intensity range based on the detection result illustrated in FIG. 6, a distance D2 between a point P4 and a point P5 and a distance D3 between a point P6 and a point P7 are extracted as the length of the slip SL. Accordingly, the distance between the point P5 and the point P6 including the point P3 where the slip SL intersect is not included in the length of the slip SL.

For this problem, in an inspection system according to a first modification, the controller 20 sets a third intensity range SR3 as illustrated in FIG. 6. The third intensity range SR3 corresponds to the intensity of the light reflected or scattered by the intersection of the slip SL. The third intensity range SR3 is set based on the second intensity range SR2. For example, the lower limit of the third intensity range SR3 is set to be not less than 1.01 times and not more than 1.05 times the upper limit of the second intensity range SR2. The upper limit of the third intensity range SR3 is set to be not less than 1.1 times and not more than 1.2 times the upper limit of the second intensity range. Or, the third intensity range SR3 may be set based on the first intensity range SRL For example, the lower limit of the third intensity range SR3 is set to be not less than 2.1 times and not more than 2.2 times the upper limit of the first intensity range SRL The upper limit of the third intensity range SR3 is set to be greater than 2.2 times but not more than 3.0 times the upper limit of the first intensity range SR1. For example, the difference between the upper limit and the lower limit of the third intensity range SR3 is the same as the difference between the upper limit and the lower limit of the second intensity range SR2.

In the case where a peak of the intensity is included in the third intensity range SR3, the controller 20 determines a first point corresponding to the peak to be an intersection of the slip SL. Then, using the first point as a starting point, the controller 20 extracts, as the length of the slip SL, the sum of each distance along the X-direction and the Y-direction to multiple second points where the intensity of the light L2 falls below the second intensity range. Thereby, in the example illustrated in FIG. 6, a distance D4 from the point P4 to the point P7 is extracted as the length in the X-direction of the slip SL.

In other words, according to the inspection system according to the first modification, in the case where the intersection of the slip SL exists, the length of the slip SL is extracted using the intersection as a starting point. In the case where the intersection of the slip SL does not exist, the length of the region where the intensity of the light L2 is included in the second intensity range is extracted as the length of the slip. Thereby, the length of the slip SL can be extracted more accurately even in the case where the intersection of the slip SL exists in the surface of the semiconductor substrate 1.

Second Modification

Figure 7:
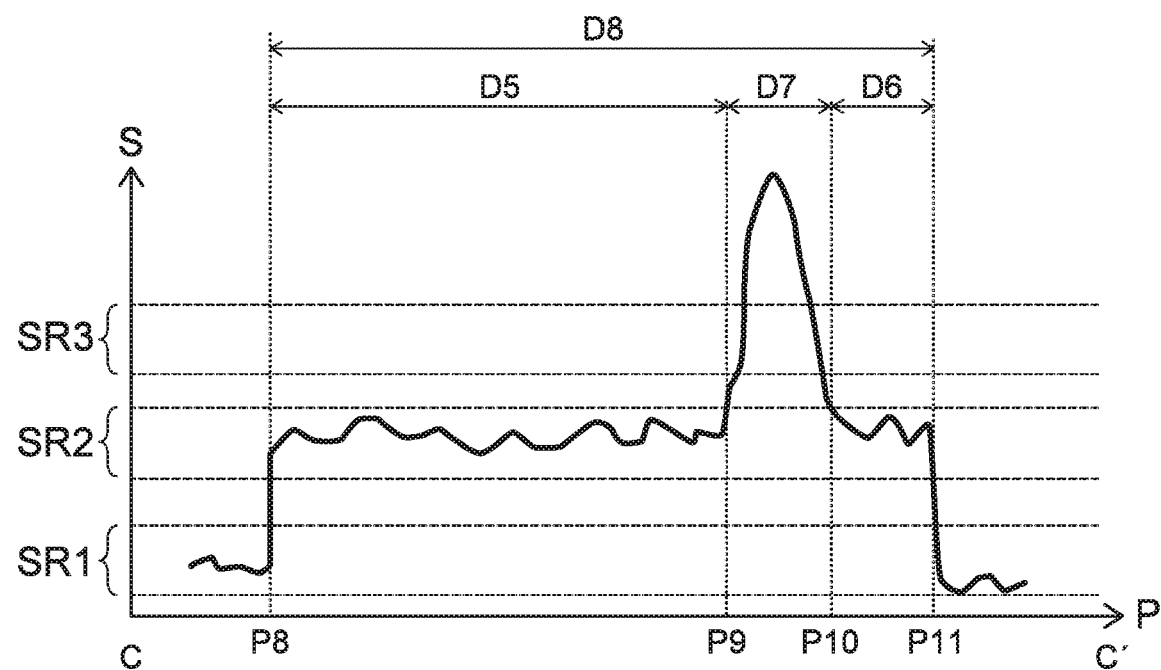
FIG. 7 is a graph illustrating a detection result of the reflected light and the scattered light of the semiconductor substrate surface.

FIG. 7 is a graph illustrating a detection result of the reflected light and the scattered light of the semiconductor substrate surface.

FIG. 7 illustrates the detection result along line C-C' of FIG. 3.

As illustrated in FIG. 3, there are cases where the foreign matter E exists on the slip SL. The intensity of the light reflected or scattered by the foreign matter E is larger than the intensity of the light reflected or scattered by the intersection of the slip SL. For example, in the example illustrated in FIG. 7, the foreign matter E exists between a point P9 and a point P10.

In such a case, it is considered that the actual slip SL extends from a point P8 to a point P11. However, in the case where the length that is extracted is only the length of the region where the intensity of the light L2 is included in the second intensity range SR2, the sum of a distance D5 from the point P8 to the point P9 and a distance D6 from the point P10 to the point P11 are extracted. Accordingly, a length that is different from a distance D8 corresponding to the length of the actual slip SL is extracted.

For this problem, in the inspection system according to the second modification, the controller 20 performs the following processing. For example, a first region and a second region exist where the intensity of the light L2 is included in the second intensity range. A third region where the intensity of the light L2 exceeds the second intensity range exists between the first region and the second region. The third region is continuous with the first region and the second region. In such a case, the controller 20 extracts, as the length of the slip SL, the sum of the length of the first region, the length of the second region, and the length of the third region.

According to this method, in the example illustrated in FIG. 7, the distance D8 which is the sum of the distance D5 corresponding to the length of the first region recited above, the distance D6 corresponding to the length of the second region recited above, and a distance D7 corresponding to the length of the third region recited above can be extracted as the length of the slip SL. Accordingly, according to the inspection system according to the modification, the length of the slip SL can be extracted more accurately even in the case where foreign matter exists on the slip SL.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. Moreover, above-mentioned embodiments can be combined mutually and can be carried out.

What is claimed is:

1. An inspection system, comprising:
    a holder configured to hold a semiconductor substrate;
    an irradiation part including an oscillator, the irradiation part being configured to irradiate a first light toward a surface of the semiconductor substrate and scanning the first light over the surface;
    a detector configured to detect an intensity of a second light generated by reflection or scattering of the first light at each point of the surface; and
    a controller, a detection result from the detector being input to the controller,
    the controller setting, based on the detection result, a first intensity range corresponding to an intensity of light reflected or scattered by a region not including slip of the surface,
    the controller setting, based on the first intensity range, a second intensity range corresponding to an intensity of light reflected or scattered by the slip of the surface, an upper limit and a lower limit of the second intensity range each being larger than an upper limit of the first intensity range,
    the controller extracting, as a length of the slip, a length of a region where the intensity of the second light is included in the second intensity range.

2. The system according to claim 1, wherein
    the controller sets a third intensity range based on the first intensity range or the second intensity range, the third intensity range corresponding to an intensity of light reflected or scattered by an intersection of the slip of the surface, an upper limit and a lower limit of the third intensity range each being larger than the upper limit of the second intensity range, and
    in the case where a peak of the intensity of the second light is included in the third intensity range, the controller extracts, as the length of the slip, the sum of distances from a first point to a plurality of second points, the distances being along a first direction and a second direction in which the slip extends, the first point corresponding to the peak, the intensity of the second light falling below the second intensity range at the plurality of second points.

3. The system according to claim 1, wherein
    in the case where a first region, a second region, and a third region exist, the controller extracts, as the length of the slip, the sum of a length of the first region, a length of the second region, and a length of the third region, the third region being continuous with the first region and the second region,
    the intensity of the second light is included in the second intensity range in the first region,
    the intensity of the second light is included in the second intensity range in the second region,
    the intensity of the second light exceeds the second intensity range in the third region,
    the second region is separated from the first region, and
    the third region is positioned between the first region and the second region.

4. The system according to claim 1, wherein
    the lower limit of the second intensity range is not less than 1.05 times and not more than 1.1 times the upper limit of the first intensity range, and
    the upper limit of the second intensity range is greater than 1.1 times but not more than 1.5 times the upper limit of the first intensity range.

5. An inspection method, comprising:
    irradiating a first light toward a surface of a semiconductor substrate and scanning the first light over the surface;
    detecting an intensity of a second light generated by reflection or scattering of the first light at each point of the surface;
    setting, based on a result of the detecting, a first intensity range corresponding to an intensity of light reflected or scattered by a region not including slip of the surface;
    setting, based on the first intensity range, a second intensity range corresponding to an intensity of light reflected or scattered by the slip of the surface, an upper limit and a lower limit of the second intensity range each being larger than an upper limit of the first intensity range; and
    extracting, as a length of the slip, a length of a region where the intensity of the second light is included in the second intensity range.

6. The method according to claim 5, further comprising:
    setting a third intensity range based on the first intensity range or the second intensity range, the third intensity range corresponding to an intensity of light reflected or scattered by an intersection of the slip of the surface, an upper limit and a lower limit of the third intensity range each being larger than the upper limit of the second intensity range; and
    in the case where a peak of the intensity of the second light is included in the third intensity range, extracting, as the length of the slip, the sum of distances from a first point to a plurality of second points, the distances being along a first direction and a second direction in which the slip extends, the first point corresponding to the peak, the intensity of the second light falling below the second intensity range at the plurality of second points.

7. The method according to claim 5, wherein
in the case where a first region, a second region, and a third region exist, the controller extracts, as the length of the slip, the sum of a length of the first region, a length of the second region, and a length of the third region, the third region being continuous with the first region and the second region,
the intensity of the second light is included in the second intensity range in the first region,
the intensity of the second light is included in the second intensity range in the second region,
the intensity of the second light exceeds the second intensity range in the third region,
the second region is separated from the first region, and
the third region is positioned between the first region and the second region.

8. The method according to claim 5, wherein
the lower limit of the second intensity range is not less than 1.05 times and not more than 1.1 times the upper limit of the first intensity range, and
the upper limit of the second intensity range is greater than 1.1 times but not more than 1.5 times the upper limit of the first intensity range.

9. A non-transitory computer-readable storage medium storing a program causing a controller to perform:
setting a first intensity range corresponding to an intensity of light reflected or scattered by a region of a surface of a semiconductor substrate not including slip;
setting, based on the first intensity range, a second intensity range corresponding to an intensity of light reflected or scattered by the slip of the surface, an upper limit and a lower limit of the second intensity range each being larger than an upper limit of the first intensity range;
referring to an intensity of a second light at each point on the surface, the second light being generated by the reflection or scattering of a first light irradiated toward the surface; and
extracting as a length of the slip, a length of a region where the intensity of the second light is included in the second intensity range.

10. The non-transitory computer-readable storage medium according to claim 9, wherein
the program causes the controller to perform:
further setting a third intensity range based on the first intensity range or the second intensity range, the third intensity range corresponding to an intensity of light reflected or scattered by an intersection of the slip of the surface, an upper limit and a lower limit of the third intensity range each being larger than the upper limit of the second intensity range; and
in the case where a peak of the intensity of the second light is included in the third intensity range, extracting, as the length of the slip, the sum of distances from a first point to a plurality of second points, the distances being along a first direction and a second direction in which the slip extends, the first point corresponding to the peak, the intensity of the second light falling below the second intensity range at the plurality of second points.

11. The non-transitory computer-readable storage medium according to claim 9, wherein
in the case where a first region, a second region, and a third region exist, the program causes the controller to extract, as the length of the slip, the sum of a length of the first region, a length of the second region, and a length of the third region, the third region being continuous with the first region and the second region,
the intensity of the second light is included in the second intensity range in the first region,
the intensity of the second light is included in the second intensity range in the second region,
the intensity of the second light exceeds the second intensity range in the third region,
the second region is separated from the first region, and
the third region is positioned between the first region and the second region.

12. The non-transitory computer-readable storage medium according to claim 9, wherein
the lower limit of the second intensity range is not less than 1.05 times and not more than 1.1 times the upper limit of the first intensity range, and
the upper limit of the second intensity range is greater than 1.1 times but not more than 1.5 times the upper limit of the first intensity range.

* * * * *